Patented Nov. 6, 1923.

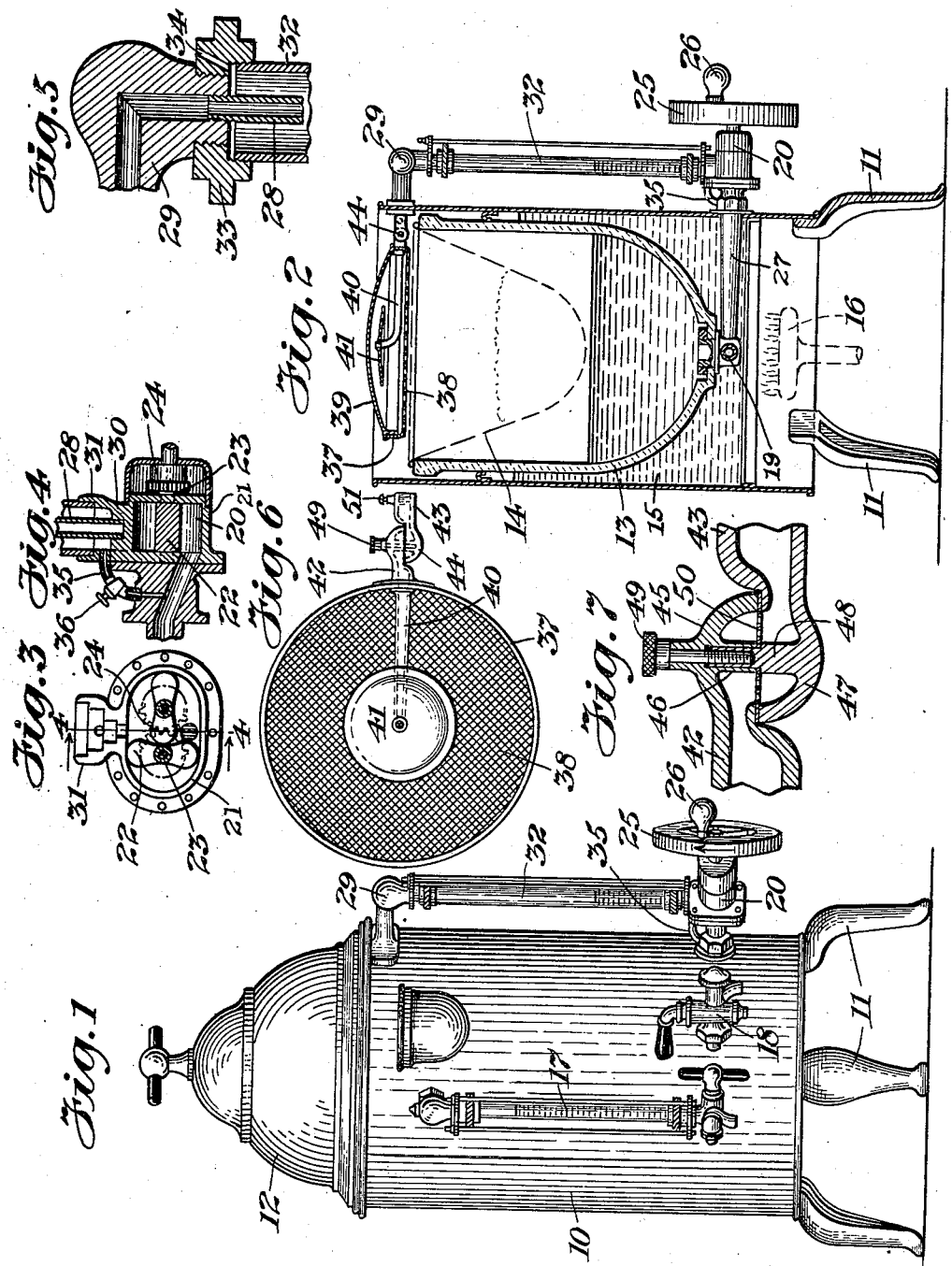

1,473,440

UNITED STATES PATENT OFFICE.

JOHANNES TH. PEDERSEN, OF FLUSHING, NEW YORK, ASSIGNOR TO AARON M. SLOSS, OF NEW YORK, N. Y.

COFFEE URN.

Application filed March 6, 1922. Serial No. 541,262.

*To all whom it may concern:*

Be it known that I, JOHANNES TH. PEDERSEN, a citizen of the United States, residing at Flushing, borough of Queens, city and State of New York, have invented an Improvement in Coffee Urns, of which the following is a specification.

This invention relates to coffee urns and more particularly to that type of coffee urn in which there is included an apparatus for passing the coffee from the bottom of the urn to the top thereof and to provide in such apparatus a device for distributing the liquid in order to cause it to pass as uniformly as possible through the ground coffee in the making of the beverage. Heretofore, in coffee urns of this type the coffee has been passed from the bottom to the top of the urn by a suitable pump caused to force the liquid through a pipe which may also include a gauge and to deliver the coffee in a substantially uniform stream to the top of the urn. In this apparatus obviously the liquid is not evenly distributed and the entire, or at least the best results cannot be obtained in making the coffee. In carrying out the invention to overcome this difficulty I employ an aerator in the upper part of the urn and this aerator device is placed at the discharge end of the system for causing the flow of the liquid so as to distribute the same evenly over the ground coffee in the urn in order to utilize all of the same to an even extent and thus obtain the best and most economical results in making the beverage.

The aerator apparatus for the coffee urn as made in accordance with this invention will be hereinafter more particularly described in conjunction with the accompanying drawings, in which, Fig. 1 is an elevation of the coffee urn in which the aerator may be incorporated.

Fig. 2 is a sectional elevation of the same with the cover removed.

Fig. 3 is a sectional elevation of a portion of the pump.

Fig. 4 is a transverse section of the pump.

Fig. 5 is a longitudinal section of the elbow forming part of the devices for transferring the liquid coffee from the bottom to the top of the urn.

Fig. 6 is a plan of the aerator with the cover thereof removed, and

Fig. 7 is a transverse section of the joint by which the aerator is connected to the pipe line.

Referring to the drawing the coffee urn in which my improved apparatus may be suitably employed comprises a body or shell 10 mounted upon suitable legs or supports 11 and fitted with a cap or cover 12. In the body 10 there is a receptacle 13 which as usual is provided with a strainer bag 14 suitably suspended from the top of the receptacle and adapted to receive the ground coffee in making the beverage. Within the body and between the same and the receptacle 13 there is a chamber 15 for water or other liquid which may be heated by a suitable burner 16 or any other device for boiling the liquid in the chamber 15 in making the coffee. As indicated in Fig. 1 the urn may be provided with a gauge 17 to show the height of the liquid in the chamber 15 and also with a faucet or tap 18 by which the liquid may be drawn from the urn. This tap 18 is connected by a suitable pipe with an outlet connection 19 fixed in the lower portion of the receptacle 13.

In this apparatus in making the coffee the liquid is caused to flow from the bottom of the receptacle 13 to the top thereof by a pump and pipe connection. As will be understood any form of pump may be employed as indicated at 20. This comprises a casing 21 in which there are revoluble pistons 22 mounted on shafts 23 which are connected by suitably meshing gears 24. One of the shafts extends exteriorly of the casing and is provided with a fly wheel 25 which, by a handle 26, may be manually turned to operate the pump. The suction end of the pump is suitably connected to the outlet or discharge connection 19 by a pipe 27 extending through the chamber 15. The discharge end of the pump is connected by a pipe 28 extending between the same and an elbow 29, which latter is connected to the upper portion of the urn. The discharge end 30 of the pump is also fitted with a flanged seat 31 adapted to receive one end of a gauge glass 32 which extends between this flanged seat 31 and a coupling or collar 33 connected to the elbow 29 and adapted to engage the upper end of the gauge glass 32, which latter, as will be understood, surrounds the pipe 28. The coupling or collar 33 as indicated in Fig. 5 is preferably provided with a vent 34. Also as illustrated in Fig. 4 the pump may be provided with a by-pass connection 35 fitted with a cock 36 and extending between the suction and discharge ends of the pump, it being understood that this by-pass is closed by suitably closing the cock when the pump is in operation and that when the pump is not in operation the cock in the by-pass pipe is open so as to permit the liquid to seek its own level and thus permit the glass tube 32 to operate as a gauge.

The apparatus to which my invention more particularly relates consists of an aerator device more particularly illustrated in Figs. 2 and 6 of the drawing. This comprises a vessel 37 having its bottom perforated or made of a material of suitable mesh as indicated at 38 and fitted with a cover 39. A suitable pipe 40 extends into the vessel 37 and is turned upwardly therein in order to have its orifice located in an approximately central position therein. Surrounding the discharge end of the pipe 40 there is a distributor disk 41. Exteriorly of the vessel 37 there is a pipe connection 42 suitably connected thereto and forming a continuation of the pipe 40; or as will be understood these parts may be made an integral structure and caused to pass through and to be suitably connected to the walls of the vessel 37. The pipe connection 42 is suitably connected to a pipe connection 43 by a hinged joint 44 or otherwise and the pipe connection 43 is connected to the walls of the urn to form a continuation of the horizontal portion of the elbow 29. As illustrated the pipe connection 42 terminates in an offset semi-spherical head 45 in which there is a centrally disposed stem 46, and similarly the pipe connection 43 terminates in a semi-spherical head 47 in which there is a centrally disposed stem 48. This stem 48 is adapted to pass through the stem 46 and is screw threaded interiorly to receive a set screw 49 by which the semi-spherical heads are connected with an intervening washer 50 which is preferably made of metal and suitably perforated in order to form the hinged joint as hereinbefore described. As illustrated the pipe connection 43 is secured to that portion of the horizontal member of the elbow 29 extending through the body of the urn by a set screw 51 or otherwise.

It will now be apparent that in making coffee with the urn, as hereinbefore described, the liquid as caused to flow from the bottom to the top of the urn by the use of the pump will pass through the pipe 28, the elbow 29 and be delivered to the aerator device in the upper portion of the urn and the pressure under which the liquid is delivered while relatively small is sufficiently great to cause the larger portion of the coffee to be projected against the inner surface of the cover and to flow down the sides of the same in all directions so as to be evenly distributed to the ground coffee as contained in the strainer bag 15. Manifestly also a relatively small portion of the liquid will flow down over the distributor disk 41 and this portion of the liquid will be evenly distributed from the periphery of the disk. It will also be apparent that by removing the cover 12 the aerator device may be turned from the position it assumes in use as illustrated in full lines, Fig. 2 to a position at right angles thereto, and in this latter position the same will in no wise interfere with the removal of the strainer bag from the urn or the cleaning of the urn and also makes it possible to readily clean the aerator device. It will also be apparent that the vapors arising from the liquid in the body member of the urn will accumulate in the upper portion of the body member including that part thereof in which the aerator vessel is located so that these vapors and the aroma of the coffee which they carry, or at least a large portion of the same, will be entrapped and returned to the body of the liquid in the body of the coffee urn by the distribution of the liquid in the aerator.

I claim as my invention:

1. In a coffee urn, a body member, a beverage receptacle within the body member, a pump and pipe connections for circulating liquid from the bottom of the beverage receptacle to the upper portion of the body member, a vessel connected to the discharge end of the said pipe connections within the body member, and means associated with the vessel for causing a distribution of the liquid in the upper portion of the body member for its return to the beverage receptacle.

2. In a coffee urn, a body member, a beverage receptacle within the same, a pump and pipe connections for circulating liquid from the lower portion of the beverage receptacle to the upper portion of the body member, a vessel in the upper portion of the body member for distributing the liquid in its return to the beverage receptacle, and means for hingedly connecting the said vessel to the said pipe connections within the said body member.

3. In a coffee urn, a body member, a beverage receptacle within the same, a pump and pipe connections for circulating a liquid from the bottom of the beverage receptacle to the top of the body member, a vessel having a perforated bottom, a cover for the said vessel, means for connecting the said vessel to the discharge end of the said pipe connections, and devices within the vessel for distributing the liquid as the same is delivered thereto from the pipe connections.

4. In a coffee urn, a body member, a beverage receptacle within the body member, a pump and pipe connections for circulating a liquid from the lower portion of the beverage receptacle to the upper portion of the body member, a vessel having a perforated bottom, a cover for said vessel, a discharge pipe leading into said vessel and terminating approximately centrally thereof in an upturned position, a distributor disk at the end of the said pipe, and means for hingedly connecting the said vessel and pipe to the discharge end of the said pipe connections.

5. In a coffee urn, a body member, a pump and pipe connections for causing the liquid to flow from the lower to the upper portions of the body member, a vessel having a perforated bottom, a cover for the said vessel, a discharge pipe leading into the said vessel and terminating approximately centrally thereof in an upturned position, a distributor disk at the end of the said pipe, and a hinged joint pipe connection for securing the said vessel and the pipe therein to the discharge end of the aforesaid end of the pipe connections.

6. In a coffee urn, a body member, a beverage receptacle within the body member, means for causing a liquid to circulate from the lower portion of the beverage receptacle to the upper portion of the body member, a vessel having a perforated bottom into which vapors from the liquid in the beverage receptacle collects, a cover for said vessel, and a discharge pipe leading into said vessel and terminating in an upturned end with the orifice thereof approximately centrally disposed relatively to the cover for the vessel whereby the liquid as discharged will strike the inner face of the cover, will be distributed over the same, and caused to pass to the sides of the vessel and flow inwardly to the center of the perforated bottom thereof.

7. In a coffee urn, a body member, a beverage receptacle within the body member, means for causing a liquid to circulate from the lower portion of the beverage receptacle to the upper portion of the body member, a vessel having a perforated bottom into which vapors from the liquid in the beverage receptacle may collect, a cover for the said vessel, a discharge pipe leading into said vessel and terminating in an upturned end with the orifice thereof approximately centrally disposed relatively to the cover of the vessel whereby the liquid as discharged strikes the central portion of the inner face of the cover, is distributed over the same and caused to pass to the sides of the vessel and over the perforated bottom toward the center thereof, and a distributor disk secured on the upturned end of the said discharge pipe.

8. In a coffee urn, a body member, a beverage receptacle within the body member, pipe connections for circulating a liquid from the lower portion of the beverage receptacle to the upper portion of the body member, a vessel including a cover, a pipe leading into said vessel and terminating approximately centrally thereof, and a hinged joint connecting the said discharge pipe to the said pipe connections within the upper portion of the body member.

Signed by me this 8th day of February, 1922.

JOHANNES TH. PEDERSËN.